C. H. REYNOLDS.
CIRCULAR SAW SHARPENER.
APPLICATION FILED OCT. 12, 1907.
905,924.
Patented Dec. 8, 1908.
2 SHEETS—SHEET 1.
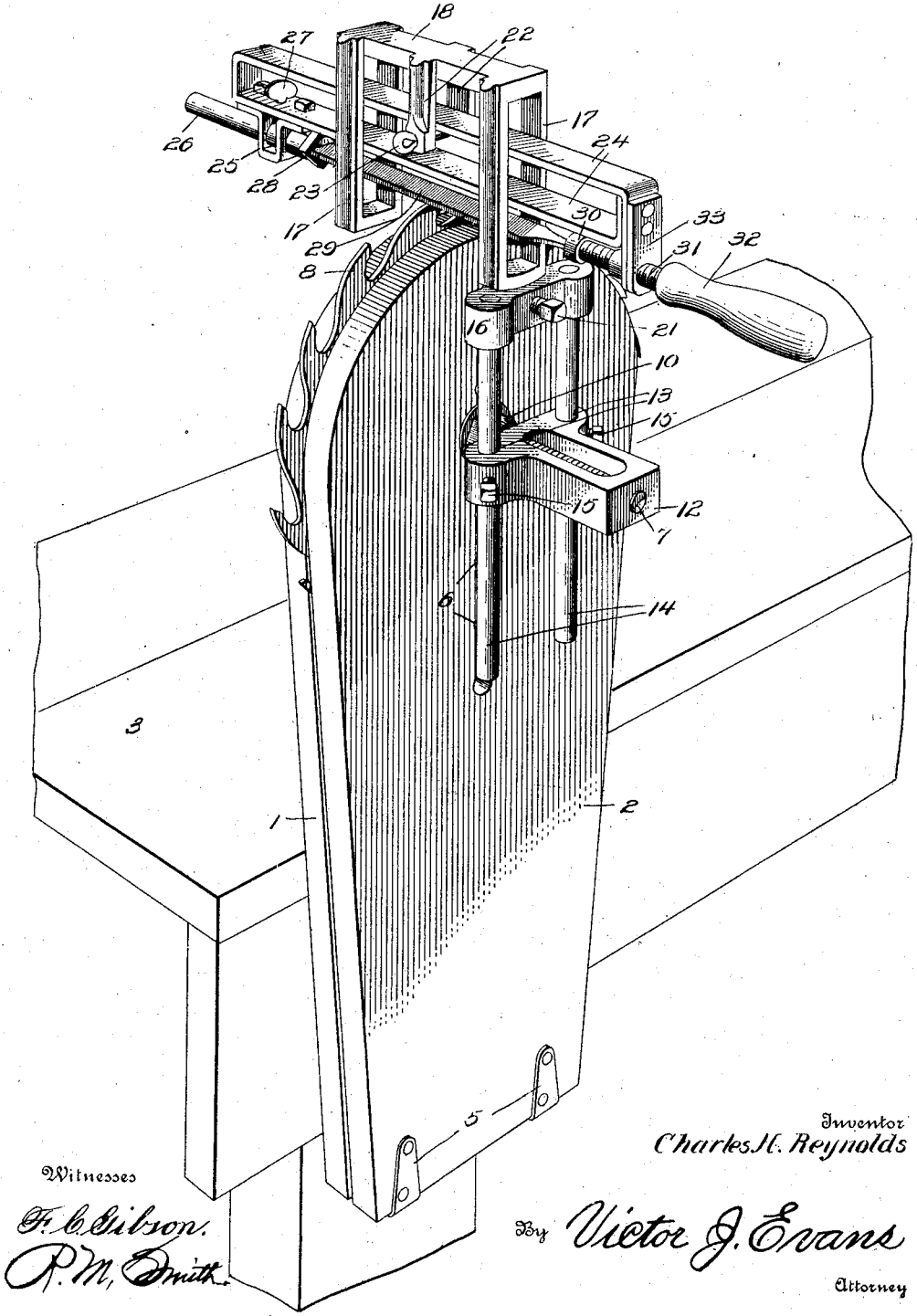

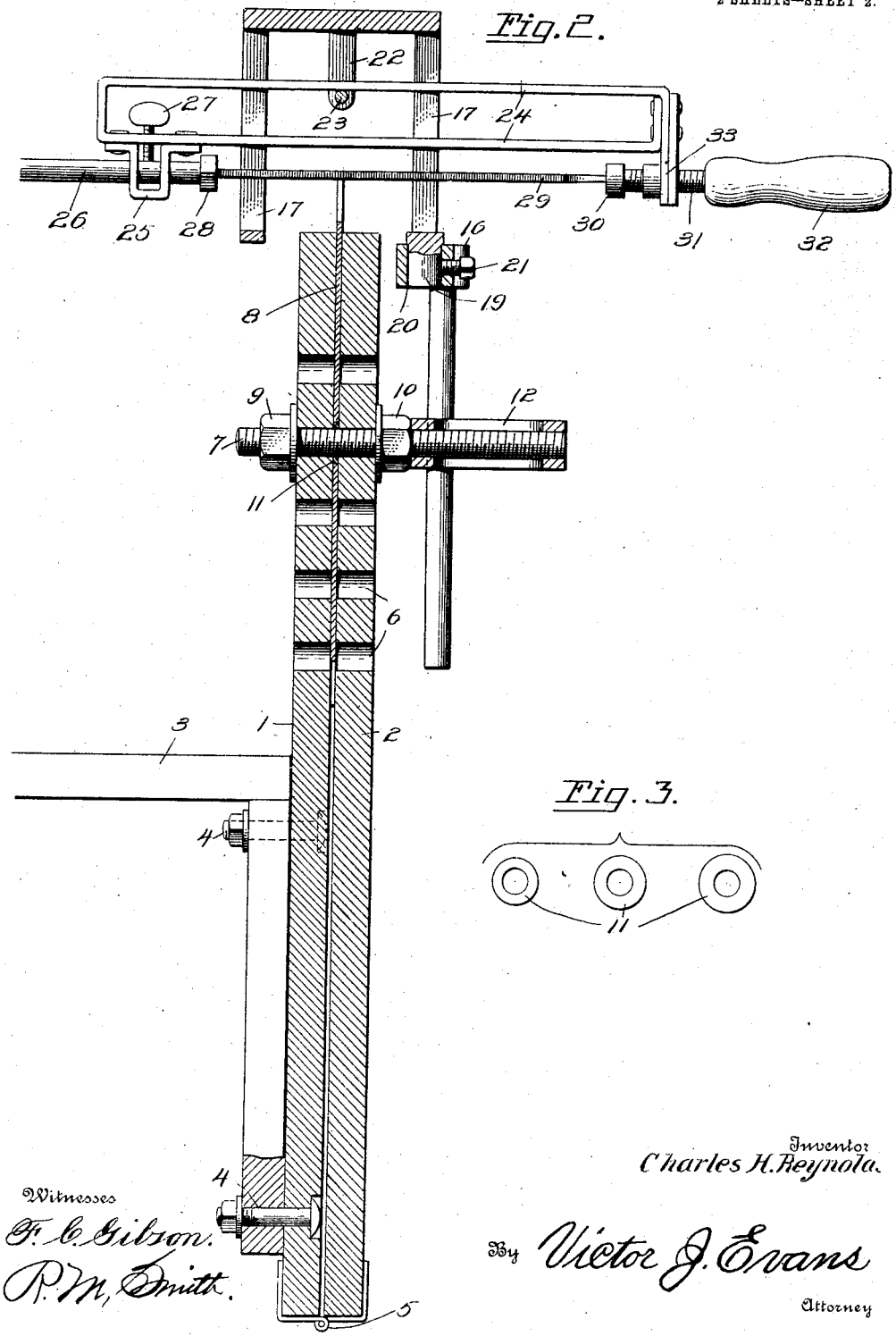

UNITED STATES PATENT OFFICE.

CHARLES H. REYNOLDS, OF MILAN, MISSOURI.

CIRCULAR-SAW SHARPENER.

No. 905,924.    Specification of Letters Patent.    Patented Dec. 8, 1908.

Application filed October 12, 1907. Serial No. 397,208.

*To all whom it may concern:*

Be it known that I, CHARLES H. REYNOLDS, a citizen of the United States, residing at Milan, in the county of Sullivan and State of Missouri, have invented new and useful Improvements in Circular-Saw Sharpeners, of which the following is a specification.

This invention relates to circular saw sharpeners, the object of the invention being to provide a convenient and reliable device for sharpening circular saws in which provision is made for the accommodation of saws of different sizes, for securely clamping and holding the saws in proper position to be operated upon and for accurately regulating the degree of cut of the file so as to insure a regular and uniform sharpening of each and every tooth of the saw.

A further object of the invention is to so construct and arrange the parts of the sharpening device that a number of teeth may be sharpened without readjusting the device and without changing the position of the saw thus effecting material saving in time.

With the above and other objects in view, the invention consists in the novel construction, combination and arrangement of parts as hereinafter fully described, illustrated and claimed.

In the accompanying drawings, Figure 1 is a perspective view of a saw sharpening device complete, showing a circular saw in a position relatively thereto. Fig. 2 is a vertical sectional view of the same, taken in line with the axis of the saw. Fig. 3 is a detail view of bushings of different sizes.

The saw sharpening device contemplated in this invention, comprises essentially a pair of jaws 1 and 2, the jaw 1 being represented as a stationary jaw adapted to be secured permanently and in a fixed position to a bench 3 or other convenient support by means of bolts 4 or their equivalent. The other jaw 2 is termed the movable jaw and is preferably connected to the stationary jaw 1 by a hinged connection shown at 5, so that the jaws may be separated to admit of the introduction of the circular saw and the removal thereof after the same has been sharpened.

The jaws are provided at corresponding points with a vertical line of holes 6 which register exactly with each other and are adapted to receive a clamp screw 7 which forms also the shaft or mandrel upon which the circular saw indicated at 8 is adapted to be mounted and to be turned for a purpose which will hereinafter appear. The turn screw 7 is provided at opposite sides of the jaws with clamping nuts 9 and 10 whereby the jaws 1 and 2 may be securely clamped together against opposite sides of the saw 8 which is thus securely held. By providing the series of holes 6, saws of various sizes may be clamped between the jaws 1 and 2 to allow the teeth of the saw to project a suitable distance above the tops of the jaws when subjected to the action of the sharpening device hereinafter described. As the central hole in the saw varies in size with different sizes of saws, a plurality of interchangeable bushings 11 are provided each having an opening of the size to receive the screw 7 so that in turning the saw 8, the teeth at the top thereof are always brought to the proper elevation.

Mounted upon the screw 7 is a bracket 12 which is left loose so that it may be turned upon the screw 7 as a center for the purpose of tilting the file holder and guide frame hereinafter described. The bracket 12 is provided with a plurality of openings 13 to receive a corresponding number of upstanding gage rods 14 which when brought to the proper height are held by means of set screws 15. The rods 14 are connected at their upper ends by a head piece 16 which forms the adjustable member of the bracket 12, said head piece being adjustable up and down with the rods 14 by manipulating the screws 15.

Supported on the head piece or adjustable bracket member 16 is a guide frame embodying a pair of oppositely arranged slotted guides 17 and a connecting yoke bar 18 from which the slotted guides depend as clearly shown in Figs. 1 and 2. The guide frame is connected to the head piece 16 by providing one of the slotted guides at its lower end with a shank 19 which is received in a step 20 in the head piece 16, said shank being securely held by a binding screw 21. The guide frame also comprises a fork consisting of parallel arms 22 depending from the yoke bar 18 and provided with oppositely arranged holes to receive a removable gage pin 23 which serves to limit the downward movement of the file holder to be described.

The file holder in the preferred embodiment of this invention is in the form of an elongated loop or double strap embodying the parallel bars 24 connected in any suitable manner at their opposite ends as illustrated in Figs. 1 and 2 to form a rigid frame. The upper one of said bars 24 lies above the gage pin 23, while the lower one of said bars operates beneath said gage pin and when the upper one of said bars 24 comes in contact with the gage pin 23, the file reaches the limit of its operative movement which is predetermined by the adjustment of the set screws 15.

The file holder is provided in its underside with a bracket 25 in which the handle 26 is adjustably mounted and held by means of a set screw 27. The handle 26 is provided with a socket 28 for the file shown at 29. The shank at the opposite end of the file is received in a swivel head 30 journaled on the inner end of the threaded shank 31 of the main handle 32, the shank 31 having a threaded engagement with the depending portion 33 of the file holder frame. By loosening the set screw 27 the handle 26 may be moved lengthwise to suit the length of the file and may be also turned sufficiently to cant the file 29 transversely and give the desired pitch thereto to correspond with the pitch to be given to the teeth of the saw. By screwing the handle 32 inward the file 29 is securely clamped and bound between the step 28 and swivel head 30.

After the saw is clamped between the jaws of the device herein above described, the adjustable member 16 of the bracket is set at proper elevation to give the desired degree of cut to the file for permitting the necessary amount of metal to be removed from each and every tooth to sharpen all of the teeth and bring them to a uniform pitch. The file frame is then reciprocated back and forth across the saw teeth in a substantially horizontal plane, and it will be observed that quite a number of teeth may be treated without removing the saw by swinging the bracket around the clamp screw 7 as a center. When the desired number of teeth have been filed, the saw may be unclamped and turned to any desired extent to bring another series of teeth into position to be sharpened. When the file becomes dull it may be easily removed without disturbing any other part of the apparatus and a new file substituted therefor. The device as a whole is portable and may be quickly set up at any place and easily adjusted for use.

Having thus fully described the invention, what is claimed as new is:—

1. A saw sharpener comprising opposing jaws, a clamping element passing through said jaws, a guide frame mounted to turn on said clamping element, and a file holder in the guide frame.

2. In a saw sharpener, a stationary jaw, a movable jaw opposed thereto, a clamp screw passing through said jaws, a guide frame mounted to turn on said clamp screw, and a file holder in the guide frame.

3. A saw sharpener comprising opposing jaws, a clamping element passing through said jaws, a guide frame mounted to turn on said clamping element and embodying an adjustable member movable toward and away from the clamping element, and a file holder in the adjustable member of the guide frame.

In testimony whereof I affix my signature in presence of two witnesses.

CHARLES H. REYNOLDS.

Witnesses:
   R. D. Morrison,
   Jno. W. Bingham.